(12) United States Patent
Greco et al.

(10) Patent No.: US 7,934,247 B2
(45) Date of Patent: Apr. 26, 2011

(54) ENCRYPTION POLICY BASED ON DATA CONTEXT RECOGNITION

(75) Inventors: Paul Merrill Greco, Tucson, AZ (US); Glen Alan Jaquette, Tucson, AZ (US); Wayne Erwin Rhoten, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 1112 days.

(21) Appl. No.: 11/530,011

(22) Filed: Sep. 7, 2006

(65) Prior Publication Data

US 2008/0066144 A1 Mar. 13, 2008

(51) Int. Cl.
*G06F 17/30* (2006.01)

(52) U.S. Cl. .......................................................... 726/1

(58) Field of Classification Search ........................ None
See application file for complete search history.

(56) References Cited

U.S. PATENT DOCUMENTS

| | | | |
|---|---|---|---|
| 6,023,643 A | 2/2000 | Jesionowski | |
| 6,295,361 B1 | 9/2001 | Kadansky et al. | |
| 6,567,914 B1 | 5/2003 | Just et al. | |
| 6,915,434 B1 | 7/2005 | Kuroda et al. | |
| 6,918,040 B2 | 7/2005 | Ries et al. | |
| 6,931,532 B1 * | 8/2005 | Davis et al. | 713/167 |
| 6,950,522 B1 | 9/2005 | Mitchell et al. | |
| 7,013,389 B1 | 3/2006 | Srivastava et al. | |
| 7,320,008 B1 * | 1/2008 | Colgrove | 1/1 |
| 7,555,769 B1 * | 6/2009 | Shapiro et al. | 726/1 |
| 2002/0164035 A1 | 11/2002 | Yokota et al. | |
| 2003/0081787 A1 | 5/2003 | Kallahalla et al. | |
| 2003/0099362 A1 | 5/2003 | Rollins | |
| 2005/0071591 A1 | 3/2005 | Goodman et al. | |
| 2005/0086471 A1 | 4/2005 | Spencer | |
| 2005/0195660 A1 * | 9/2005 | Kavuri et al. | 365/189.05 |
| 2005/0204161 A1 | 9/2005 | Caronni | |
| 2005/0207570 A1 | 9/2005 | Yamamoto et al. | |
| 2005/0226423 A1 | 10/2005 | Li et al. | |
| 2006/0062383 A1 | 3/2006 | Kaneda et al. | |
| 2007/0083759 A1 * | 4/2007 | Drew et al. | 713/168 |
| 2007/0276991 A1 * | 11/2007 | Jaquette et al. | 711/111 |

OTHER PUBLICATIONS

U.S. Patent Application entitled "Selective Encryption of Data Stored on Removable Media in an Automated Data Storage Library", U.S. Appl. No. 11/470,670, filed Sep. 7, 2006, by inventors B. G. Goodman, J.A Fisher, and L.G. Jesionowski.

"Advanced Encryption Standard (AES)", Federal Information Processing Standards Publication 197, Nov. 26, 2001, pp. 1-51.

"IBM TotalStorage Enterprise Tape System 3592—SCSI Reference" IBM Corporation, Document No. GA32-0466-02, Oct. 2005.

D. A. McGrew, et al., "The Galois/Counter Mode of Operation (GCM)", May 31, 2005, pp. 1-44.

"IEEE P1619.1/D8 Draft Standard Architecture for Encrypted Variable Block Storade Media", IEEE, 2006, pp. 1-26.

(Continued)

*Primary Examiner* — David J Pearson

(74) *Attorney, Agent, or Firm* — Janaki K. Davda; Konrad Raynes & Victor LLP

(57) ABSTRACT

Provided are techniques for determining whether to encrypt data. It is determined whether an element is to be encrypted based on an encryption policy, wherein the element comprises one of metadata and a data set. In response to determining that the element is to be encrypted, the element is encrypted and written to a data storage medium. In response to determining that the element is not to be encrypted, the element is written in the effective clear to the data storage medium.

25 Claims, 5 Drawing Sheets

OTHER PUBLICATIONS

U.S Patent Application entitled "Configuring a Storage Drive to Communicate With Encryption and Key Managers", U.S. Appl. No. 11/530,022, filed Sep. 7, 2006, by inventors B.G. Goodman, G.A. Jaquette, L.G. Jesionowski and P.M. Greco.

U.S. Patent Application entitled "Keyless Copy of Encrypted Data", U.S. Appl. No. 11/530,008, filed Sep. 7, 2006, by inventors P.M. Greco and G.A. Jaquette.

U.S. Patent Application entitled "Key Generation and Retrieval Using Key Servers", U.S. Appl. No. 11/530,006, filed Sep. 7, 2006, by inventors P.M. Greco, T.J. Hahn and G.A. Jaquette.

U.S. Patent Application entitled "Maintaining Encryption Key Integrity", U.S. Appl. No. 11/530,012, filed Sep. 7, 2006, by inventors P.M. Greco, M.J. Sandberg and S.J. Schaffer.

U.S. Patent Application entitled "Detection and Handling of Encryption Key and Initialization Vector", U.S. Appl. No. 11/530,010, filed Sep. 7, 2006, by inventors P.M. Greco, M.J. Sandberg, and S.J. Schaffer.

U.S. Patent Application entitled "Verification of Encryption Key", U.S. Appl. No. 11/530,009, filed Sep. 7, 2006, by inventors P.M. Greco, S. Halevi and G.A. Jaquette.

U.S. Patent Application entitled "Automatically Filling a Drive Table", U.S. Appl. No. 11/530,013, filed Sep. 7, 2006, by inventors T.J Hahn and G.A. Jaquette.

U.S. Patent Application entitled "Recovering Remnant Encrypted Data on a Removable Storage Media", U.S. Appl. No. 11/530,021, filed Sep. 7, 2006, by inventors E.M. Dawson, P.M. Greco, G.A. Jaquette, and J.M. Karp.

U.S. Patent Application entitled "Validating an Encryption Key File on Removable Storage Media", U.S. Appl. No. 11/530,019, filed Sep. 7, 2006, by inventors H. Itagaki, J.M. Karp, H. Nakayama, T. Shiratori and P.M. Greco.

U.S. Patent Application entitled "Data Library Background Operations System Apparatus and Method", U.S. Appl. No. 11/470,964, filed Sep. 7, 2006, by inventors B.G. Goodman and L.G. Jesionowski.

U.S. Patent Application entitled "Secure Transmission of Cryptographic Key", U.S. Appl. No. 11/530,014, filed Sep. 7, 2006, by inventors P.M. Greco, M.J. Sandberg, and S.J. Schaffer.

U.S. Patent Application entitled "Rekeying Encryption for Removable Storage Media", U.S. Appl. No. 11/470,994, filed Sep. 7, 2006, by inventors J.A. Fisher, B.G. Goodman, G.A. Jaquette, and L.G. Jesionowski.

U.S. Patent Application entitled "Apparatus, System, and Method for Self-Describing Heterogeneous Magnetic Tape Formatting", U.S. Appl. No. 11/679,736, filed Feb. 27, 2007, by inventors, G.A. Jaquette, S.J. Schaffer and T. Shiratori.

U.S. Patent Application entitled "System and Method for Processing User Data in an Encryption Pipeline", U.S. Appl. No. 11/688,445, filed Mar. 20, 2007, by inventors P.M. Greco, S. Halevi, and G.A. Jaquette.

U.S. Patent Application entitled "Method, System and Apparatus for Dynamically Validating a Data Encryption Operation", U.S. Appl. No. 11/285,408, filed Nov. 22, 2005, by inventors P.M. Greco, M.J. Sandberg, and S.J. Schaffer.

U.S. Patent Application entitled "Use of Indirect Data Keys for Encrypted Tape Cartridges", U.S. Appl. No. 11/742,819, filed May 1, 2007, by inventors P.M. Greco, S. Halevi, and G.A. Jaquette.

\* cited by examiner

200

```
VOLUME LABELS:
BOP<"VOL1"<volser>>
BOP<"VOL1"<volser>><FM>
BOP<"VOL1"<volser>><FM><FM>
```

```
HEADER LABELS:
<"HDR1"><FM>
<"HDR1"><FM><FM>
<"HDR1"><"HDR2"><FM>
<"HDR1"><"HDR2"><FM><FM>
<"HDR1"><"HDR2"><"UHL<?>">...<"UHL<?>"><FM>
<"HDR1"><"HDR2"><"UHL<?>">...<"UHL<?>"><FM><FM>
```

```
TRAILER LABELS FOR END OF FILE:
<FM>
<FM><FM>
<FM><"EOF1"><FM>
<FM><"EOF1"><FM><FM>
<FM><"EOF1"><"EOF2"><FM>
<FM><"EOF1"><"EOF2"><FM><FM>
<FM><"EOF1"><"EOF2"><"UTL<?>">...<"UTL<?>"><FM>
<FM><"EOF1"><"EOF2"><"UTL<?>">...<"UTL<?>"><FM><FM>
```

```
TRAILER LABELS FOR END OF VOLUME:
<FM><"EOV1"><FM>
<FM><"EOV1"><FM><FM>
<FM><"EOV1"><"EOV2"><FM>
<FM><"EOV1"><"EOV2"><FM><FM>
<FM><"EOV1"><"EOV2"><"UTL<?>">...<"UTL<?>"><FM>
<FM><"EOV1"><"EOV2"><"UTL<?>">...<"UTL<?>"><FM><FM>
```

FIG. 5

ENCRYPTION POLICY BASED ON DATA CONTEXT RECOGNITION

BACKGROUND

1. Field

Embodiments of the invention relate to an encryption policy that is based on data context recognition.

2. Description of the Related Art

Automated data storage libraries (e.g. tape libraries including tape drives) are known for providing cost effective storage and retrieval of large quantities of data. The data in automated data storage libraries is stored on date storage media (e.g. tape cartridges) that are, in turn, stored in storage slots (or storage shelves or the like) inside the library in a fashion that renders the data storage media, and its resident data, accessible for physical retrieval. An accessor may be used to move data storage media (e.g., tape cartridges) between the storage slots and data storage drives (e.g., tape drives). Such data storage media are commonly termed "removable media." Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, Compactflash™, Smartmedia™, Memory Stick™, etc.), or other suitable media. Typically, the data stored in automated data storage libraries is resident on data storage media that is contained within a cartridge and referred to as a data storage media cartridge. An example of a data storage media cartridge that is widely employed in automated data storage libraries for data storage is a tape cartridge.

Sometimes data that is written to the data storage media is encrypted and data that is read from the data storage media is to be decrypted. Encryption may be described as the transformation of data into a form, called a ciphertext, using an encryption key that cannot be easily transformed back to the original data without the decryption key. Decryption may be described as the process of transforming the encrypted data back into its original form using a decryption key.

Encryption protects data written to a tape cartridge from unauthorized exposure and unauthorized modification, but can also create problems. In particular, if all data written to the tape cartridge, including labels (i.e. the first one or more records written to tape), headers (i.e. containing information about the data on the tape, such as information describing the following set of data (data set), the source of that data or information that associates the tape with a data storage medium management system), and trailers (i.e. indicating an end of the data), is indiscriminately encrypted and keys for decrypting the data are not available or known, then tape drives, which rely on reading such data may he unable to process (e.g. transfer data from) the tape cartridge.

Without being able to recognize data to be encrypted versus that is not to be encrypted, the tape may:
1. Encrypt all data with a same encryption data key (i.e. indiscriminate single-key encryption)
2. Encrypt each record or set of records (e.g. every 10 records could be a set) with a different key (i.e. indiscriminate encryption of all data, but using multiple keys)
3. Not encrypt with a secret key or may not make any use of encryption However, encryption of all data leads to problems when the tape drive needs to read certain data and keys for decrypting the data are not available or known, and not encrypting data provides no protection of the data.

Thus, there is a need in the art for an encryption policy that is based on data context recognition.

SUMMARY OF EMBODIMENTS OF THE INVENTION

Provided are a method, computer program product, and system for determining whether to encrypt data. It is determined whether an element is to be encrypted based on an encryption policy, wherein the element comprises one of metadata and a data set. In response to determining that the element is to be encrypted, the element is encrypted and written to a data storage medium. In response to determining that the element is not to be encrypted, the element is written in the effective clear to the data storage medium.

BRIEF DESCRIPTION OF THE DRAWINGS

Referring now to the drawings in which like reference numbers represent corresponding parts throughout:

FIG. 2 illustrates example recognized forms of metadata for writing volume labels in accordance with certain embodiments.

FIG. 3 illustrates example recognized forms of metadata for writing header labels in accordance with certain embodiments.

FIG. 4 illustrates example recognized forms of metadata for writing trailer labels for end of file in accordance with certain embodiments.

FIG. 5 illustrates example recognized forms of metadata for writing trailer labels for end of volume in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from die scope of the invention.

Figure 1:
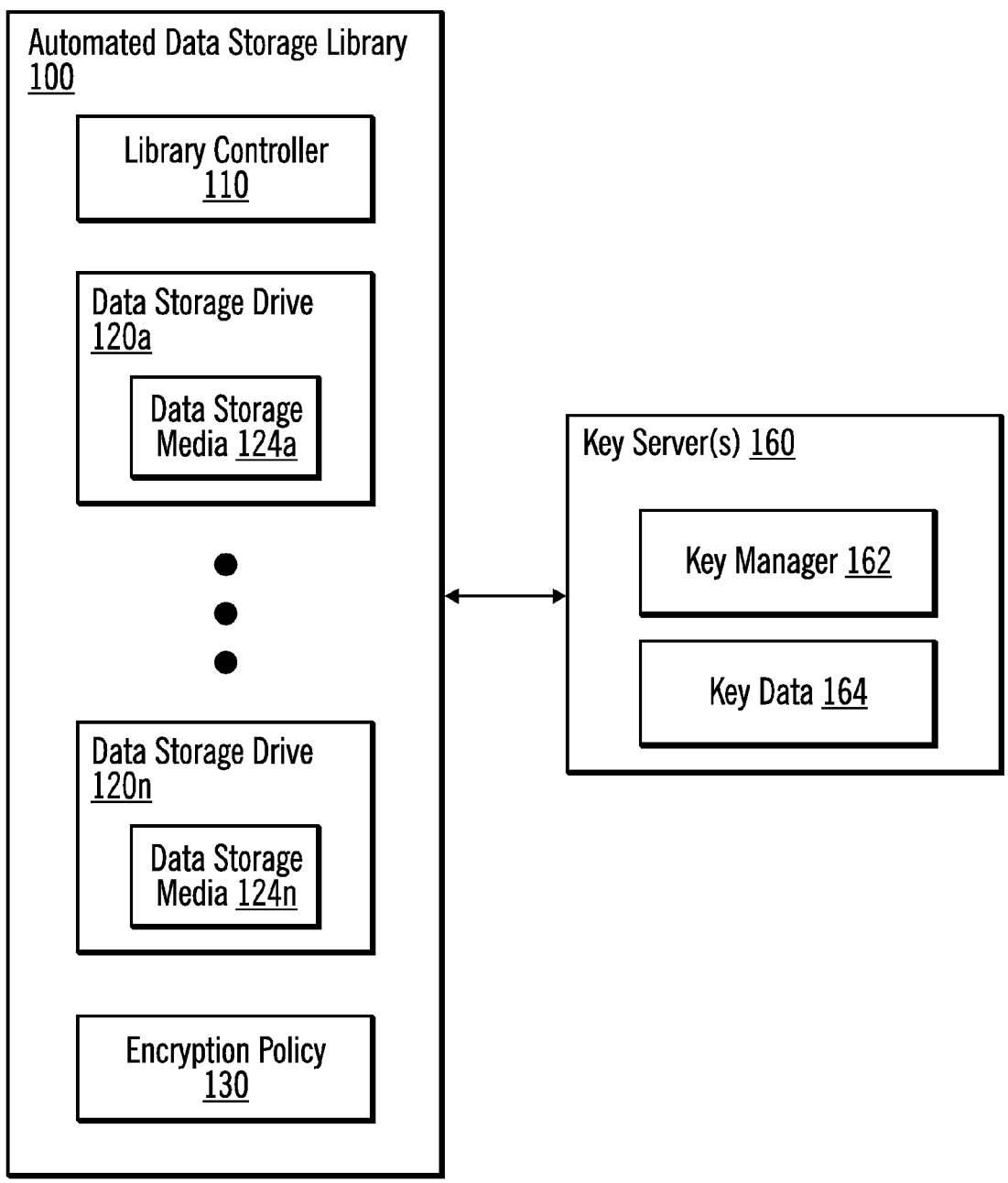
FIG. 1 illustrates details of a computing architecture in accordance with certain embodiments.

FIG. 1 illustrates details of a computing architecture in accordance with certain embodiments. An automated data storage library 100 includes a library controller 110, data storage drives 120a . . . 120n (e.g. tape drives), media inserted into those data storage drives 120a . . . 120n, such as data storage media 124a . . . 124n, and an encryption policy 130. Each data storage drive 120a . . . 120n is loaded with data storage media 124a . . . 124n (e.g. tape cartridges). The data storage drives 120a . . . 120n enable reading information from and writing information to data storage media 124a . . . 124n (e.g. tape cartridges). It is to be understood that the use of ellipses and suffixes of "a" and "n" after a reference number (e.g. 124a . . . 124n) in the diagram indicates that fewer or more elements than those shown may be used without departing from the scope of embodiments. Also, the data storage drives are encryption enabled data storage drives (i.e. they are able to encrypt data that is being written on data storage media 124a . . . 124n and decrypt encrypted data that is read from the data storage media 124a . . . 124n). In certain embodiments, the data storage drives 120a . . . 120n are tape drives that move tape cartridges, as well as enable reading information to and writing information from those tape cartridges. The data storage drives 120a . . . 120n may be grouped into one or more data storage drive pools (not shown). For example, the data storage drive pools may be tape drive pools, and each tape drive pool includes a subset of the tape drives in the automated data storage library 100.

The automated data storage library 100 is also connected to one or more key servers 160. Although the automated data storage library 100 is illustrated as being directly connected to the one or more key servers 160, the automated data storage library 100 may be connected to proxy servers (not shown) that are connected to the one or more key servers 160. A proxy server may be described as a server that receives requests intended for another computing device (e.g. another server or appliance) and that acts on behalf of the requestor (as the requestors' proxy) to obtain the requested service. In embodiments using proxy servers, the proxy servers may act as proxies for the data storage drives 120a . . . 120n and/or the data storage drive pools. A proxy server may also be described as a conduit that also acts as a protocol converter and adds other functionality (e.g. Internet Protocol (IP) routing). Thus there may be a proxy server between a key server 180 and a data storage drive 120a . . . 120n (or may not), and, if there is, the proxy server acts as a bridge between one type of interface (e.g. Fiber Channel (FC) or RS-422) and another (e.g. IP).

The one or more key server's 160 each include a key manager 162 and key data 164. The key manager 162 assists encryption-enabled data storage drives 120a . . . 120n (e.g. tape drives) in generating, protecting, storing, and maintaining encryption keys that are used to encrypt information being written to, and decrypt information being read from, data storage media 124a . . . 124n (e.g. tape cartridges). The key manager 162 is capable of serving numerous data storage drives 120a . . . 120n, regardless of where those data storage drives 120a . . . 120n reside (e.g. in an automated data storage library 100, connected to mainframe systems through various types of channel connections, or Installed in other computing systems.)

The key manager 162 processes key generation or key retrieval requests. In particular, when a data storage drive 120a . . . 120n is to write encrypted data, the data storage drive 120a . . . 120n first requests an encryption key from a key server 160. Upon receipt of the request at the key server 160, the key manager 162 generates an encryption key (e.g. an Advanced Encryption Standard (AES) key) and serves the generated encryption key to the data storage drive 120a . . . 120n in two protected forms:

1. As a protected key that is encrypted or wrapped (e.g. using Rivest-Shamir-Adleman (RSA) key pairs). The data storage drive 120a . . . 120n writes one or more protected keys to one or more non-volatile areas within the data storage media 124a . . . 124n. In certain embodiment, a non-volatile area is a data storage leader (i.e. the front part of a data storage medium 124a . . . 124n, before the area that user data is stored). In certain embodiments, the protected key may also be referred to as an Externally Encrypted Data Key (EEDK).

2. As a separately encrypted key for secure transfer to and only readable by the data storage drive 120a . . . 120n where it is decrypted upon arrival and used to encrypt the data being written to data storage media 124a . . . 124n. Once the data storage drive 120a . . . 120n encrypts data with this key and is instructed to unload this data storage medium 124a . . . 124n, this key is removed from access, usage by or retrieval from the data storage drive 120a . . . 120n.

When an encrypted data storage medium 124a . . . 124n is to be read, the data storage drive 120a . . . 120n sends the protected key read from the data storage medium 124a . . . 124n to die key manager 182, along with the request to retrieve the key needed to read the data storage medium 124a . . . 124n. The key manager 162 unwraps (decrypts) the wrapped (protected) key to access the secret key and then rewraps (encrypts) this secret key with another key for secure data transfer back to the data storage drive 120a . . . 120n (only readable by the data storage drive 120a . . . 120n), where the rewrapped key is then unwrapped to access the secret key, which is used to decrypt the data stored on the data storage medium 124a . . . 124n. The key manager 162 allows protected keys to be re-encrypted using different keys (e.g. different RSA keys) from the original ones that were used. The key data 164 may be described as a key store of keys used to create (encrypt) or unwrap (decrypt) the protected key. Also, the key data 164 may be described as including version information, an identifier of the proper keys to use in interpreting key data, and the encrypted encryption keys (which are also referred to as protected keys).

Multiple key servers 160 with key managers 162 may be provided to enable high availability (i.e. if one key server 160 is unavailable, another may be used by a data storage drive 120a . . . 120n).

In certain embodiments, the automated data storage library 100 is a tape library that includes tape drives into which tape cartridges may be inserted.

In certain embodiments, a direct key model is implemented. With the direct key model, an application that writes data provides keys to the data storage drives 120a . . . 120n in either a wrapped or direct (key only) manner. The application is not shown in FIG. 1, but would be connected to one or more of data storage drives 120a . . . 120n.

Embodiments discriminate between what is to be encrypted and what is not to be encrypted (i.e. encryption may be turned on and off) while writing data to a data storage medium 124a . . . 124n. Further, if data is to be encrypted, embodiments identify one or more encryption keys to be used to encrypt the data.

The data storage media 124a . . . 124n store data sets and metadata. For ease of reference, the data sets and metadata will be referred to herein as "elements". The data sets may be described as sets of records that may have associated metadata (e.g. describing the records) and are delineated by recognizable metadata that may be recognized by the data storage drives 120a . . . 120n. In certain embodiments, the data sets do not include the recognizable metadata with which they are delineated. In certain embodiments, a smallest meaningful system relevant logical recording unit is a logical block (which may be a data record or a filemark). Filemarks may be described as tape format elements that may be used to delineate records and are well known relating to tape drives. Labels may be said to be comprised of those records/filemarks meeting sequencing characteristics and/or contents as defined. Labels both describe and delineate user data on the medium. Labels are examples of recognizable metadata that delineate data sets. In certain embodiments a data set may be a file. Metadata includes, for example, data storage medium labels, headers, trailers, and end of volume information. Metadata may be described as information about the data storage medium 124a . . . 124n (e.g., identifying a volume and its owner), the data on the data storage medium 124a . . . 124n and/or as simple separators/delineators.

The data storage drive 120a . . . 120n is able to identify recognized forms of metadata for writing metadata to a data storage medium 124a . . . 124n. For example, a data storage medium label is written according to recognized forms of metadata used to write data storage medium labels. Similarly, recognized forms of metadata for headers, trailers, and end of volume information written to data storage media 124a . . . 124n are written according to certain recognized forms of metadata. The recognized forms of metadata may be described as providing the format or data structure of the data (e.g. data sets and metadata). In certain embodiments, it may be said that the data storage drive 120a . . . 120n applies an encryption policy 130 based on recognition of data structures or data context recognition.

FIG. 2 illustrates example recognized forms of metadata 200 for writing volume labels in accordance with certain embodiments. FIG. 3 illustrates example recognized forms of metadata 300 for writing header labels in accordance with certain embodiments. FIG. 4 illustrates example recognized forms of metadata 400 for writing trailer labels for end of file in accordance with certain embodiments. FIG. 5 illustrates example recognized forms of metadata 500 for writing trailer labels for end of volume in accordance with certain embodiments.

It can be said that there are three kinds of labels: volume, header and trailer. Volume labels may be described as labels at the beginning of the data storage medium 124a . . . 124n. Header labels may be described as labels before each data set. In certain embodiments, header labels are preceded by "BOP<"VOL1"<volser>>" or "<FM>". Trailer labels may be described as labels following one or more data sets. Thus, the data storage medium 124a . . . 124n may begin with one or more volume labels, with data sets being preceded by header labels. Trailer labels may be for end of file (i.e. the end of a file being written to the data storage medium 124a . . . 124n) or may be for end of volume (i.e. indicating the end of the volume on that data storage medium 124a . . . 124n, although the volume continues on another data storage medium 124a . . . 124n).

In the recognized forms of metadata 200, 300, 400, 500, BOP stands for Beginning of Partition, volser stands for volume serial number, FM stands for File Mark, HDR stands for header, UHL stands for User Header Label, EOF stands for End of File, and UTL stands for User Trailer Label. In certain embodiments, the ENDOFVOLUME metadata is typically written after early warning indicators are raised and is not overwritten.

In FIGS. 2-5, the recognized forms of metadata 200, 300, 400, 500 may also be referred to as metadata recognition features. In certain embodiments, the recognized forms of metadata 200, 300, 400, 500 are ones described in the IBM TotalStorage Enterprise Tape System 3592 SCSI Reference available from International Business Machines Corporation. However, embodiments are applicable to any standard for defining elements (i.e. data sets and metadata) so that a data storage drive 120a . . . 120n is able to recognize the different elements.

The following is Example (1) of a recognized forms of metadata;
 BPP<"VOL1"
  123456><"HDR1"><"HDR2"><"UHL1"> . . . <"UHL3"><FM><FM> is . . .

In Example (1), BOP indicates this sequence starts at Logical Block (LB) 0. In Example (1), LB 0 is a record of 10 bytes or more starting with "VOL1123456", LB 1 is a record of 4 bytes or more starting with "HDR1", LB 2 is a record of 4 bytes or more starting with "HDR2", LB 3 is a record of 4 bytes or more starting with "UHL1", LB 4 is a record of 4 bytes or more starting with "UHL2". LB 5 is a record of 4 bytes or more starting with "UHL3", LB 6 is a filemark, and LB 7 is a filemark.

As an example, when an encryption policy 130 specifies that data on a data storage medium 124a . . . 124n (e.g. a tape cartridge from a Data Facility Storage Management Subsystem (DFSMS)) other than a data storage medium label is to be encrypted, the data storage drive 120a . . . 120n is capable of discriminating between the data storage medium label and the rest of the data on the data storage medium 124a . . . 124n and is capable of encrypting the data to be encrypted without encrypting the data storage medium label. The result is that data on that data storage medium 124a . . . 124n is encrypted, without encrypting the data storage medium label.

Thus, with embodiments, the data storage drive 120a . . . 120n performs data context recognition (i.e. recognition of metadata and data sets) being written to data storage media 124a . . . 124n. The data storage drive 120a . . . 120n is then able to discriminately write certain elements in encrypted form and other elements in the effective clear (e.g. write some or all of the data sets in encrypted form and the metadata in unencrypted form (i.e. clear text) form discriminately). Data that is written "in the effective clear" refers to data that does not need to be encrypted, but that may be encrypted. Because the data itself does not need to be encrypted, any well-known key (e.g. a "zero key") or now key at all may be used to write the data, without any concern that the key is known or that the data may be read. In certain embodiments, the key may be a key made publicly available. Thus, data that is in the effective clear may be described as data that may be written unencrypted or encrypted with a well known key.

In addition to specifying when to turn write encryption on and when to turn write encryption off, embodiments also allow for an encryption policy 130 to specify whether one or multiple encryption keys are to be used. Thus, the data storage drive 120a . . . 120n is capable of using multiple encryption keys (e.g. obtaining new encryption keys supplied from some external entity or to causing new encryption keys to be derived from one that has already been received) for encrypting different elements. As an example, all data written between the first header and the first trailer (e.g. which might represent a first Multiple Virtual Storage (MVS®) operating system data set on that data storage medium 124a . . . 124n) may be encrypted with a first key, while a different key is used for all data written between a second header and a second trailer and yet another different key is used for all data written between a third header and a third trailer.

Figure 6:
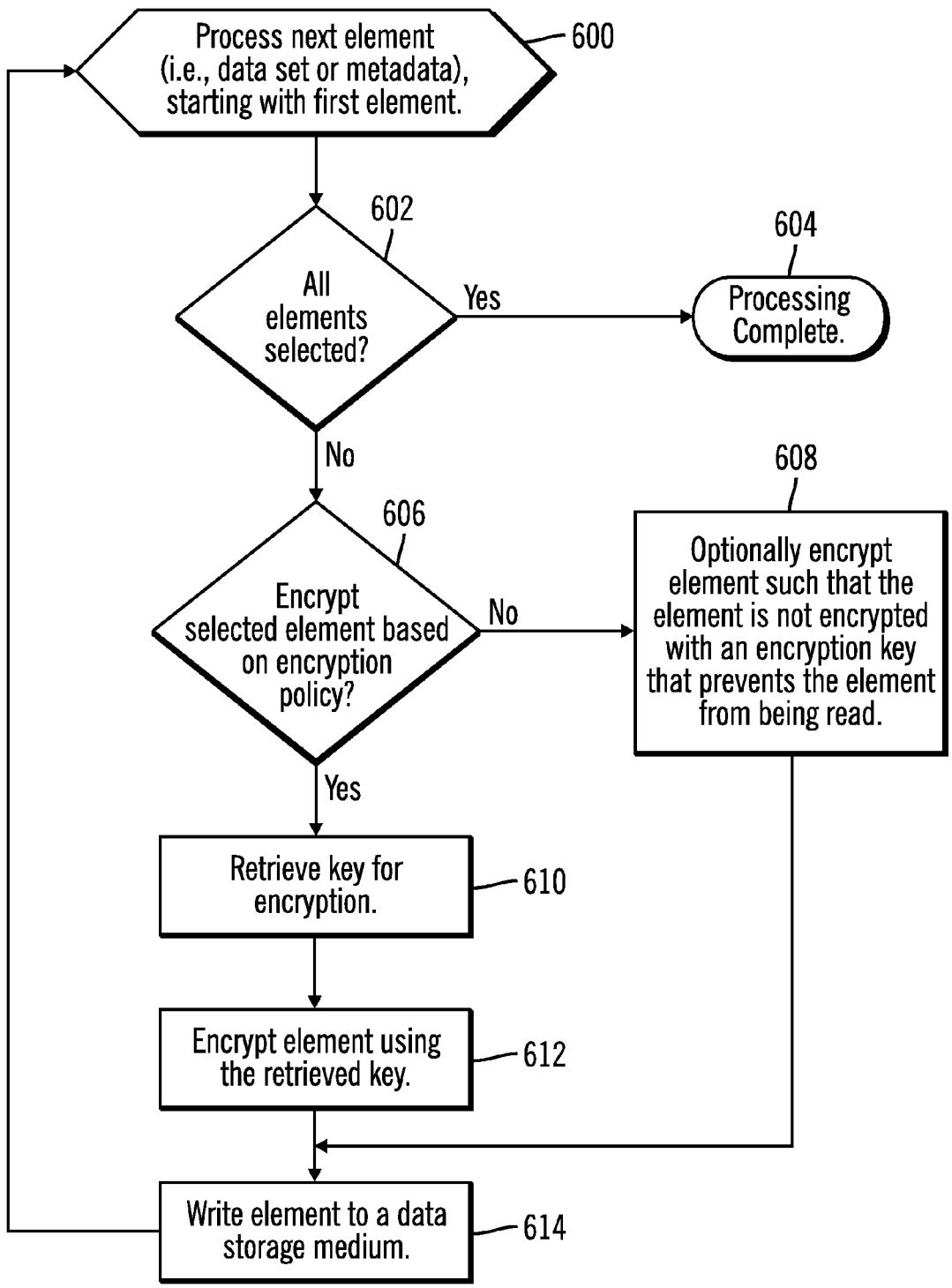
FIG. 6 illustrates logic performed by a data storage drive in accordance with certain embodiments.

FIG. 6 illustrates logic performed by a data storage drive 120a . . . 120n in accordance with certain embodiments. Control begins at block 600 with the data storage drive 120a . . . 120n processing a next element (i.e. a data set or metadata), starting with a first element. The elements that are processed may be from a host, an application, another data storage medium 124a . . . 124n or other source. In certain embodiments, the logic of FIG. 6 is applicable to an initial data write where this applies. In such embodiments, the processing of a next element in block 600 may be from a host write command, which may have come from a host based copy or from another data storage medium writing application, which as part of its operation, generates data streams that include generating metadata (e.g. labels) mixed with application or user data. In block 602, the data storage drive determines whether all elements have been selected. If so, processing continues to block 604, otherwise, processing continues to block 606. In block 604, processing is done.

In block 606, the data storage drive 120a . . . 120n determines whether the selected element is to be encrypted based on an encryption policy 130.

The following are examples of encryption policies:

1. A volume label is written in the effective clear, but all elements written after the volume label is written encrypted.

2. All metadata (e.g. data storage medium label, headers, trailers, and the End of Volume (EoV)) are written in the effective clear, but all data not recognized as metadata (which may or may not be restricted to data that lies between a header and a trailer, as a data in a data set might) are written encrypted.

3. Some non-null selective subset of metadata may be written in the effective clear, while all other elements are written encrypted (e.g. leaving certain of the data storage medium label and headers written in the effective clear, but encrypting all other elements, including the trailers, end of volume, and data sets).

4. The inverse of any of the above three encryption policies (e.g. the metadata is encrypted, while data sets are written in the effective clear).

In certain embodiments, the encryption policy 130 to be used by the data storage drive 120a . . . 120n may be "soft coded" in that the encryption policy 130 is selected (e.g. by a system administrator or other user) using a mode select setting input via a Graphical User Interface (GUI) provided by embodiments of the invention. In certain embodiments, the encryption policy to be used is hard coded (e.g. via a Vital Product Data (VPD) setting, which may be described as a non-volatile device configuration setting). Thus, it may be said that the encryption policy 130 to be used is based on how the data storage drive is programmed to operate.

The encryption policy 130 may also specify whether one or multiple, different encryption keys are to be used for encrypting the elements to be encrypted. That is, the encryption policy 130 may specify whether the data storage drive 120a . . . 120n is to obtain a new encryption key or to cause a encryption key to be derived from one that has already been received for a particular element or group of elements (e.g. every 10 data sets) to be encrypted. Also, the encryption policy 130 may specify whether all data is to be encrypted with one key or encrypted with different keys (either derived from one key or obtained from the key manager 182, either at one time or as needed).

In block 608, if it is determined that the selected element is to be encrypted, processing continues to block 610, otherwise, processing continues to block 608.

In block 608, the element may optionally be encrypted such that die element is not encrypted with an encryption key that prevents the element from being read (e.g. the encryption may be with a well known key, such as a Zero key). From block 608, processing continues to block 614.

In block 610, the data storage drive 120a . . . 120n retrieves a key for encryption. In various embodiments, the retrieval of the key for encryption may be retrieval from memory, deriving the encryption key from an existing encryption key, and the retrieval of the key for encryption from the key manager 162. That is, in certain embodiments, there is one key negotiation between die data storage drive 120a . . . 120n and a key manager 162, and, whenever data is encrypted, even if not contiguous on the data storage medium 124a . . . 124n, that one key is used. In certain embodiments, there is only one key transfer, of some set of keys, from the key manager 182 to the data storage drive 120a . . . 120n, and different data is encrypted with different keys, but the keys for encryption are transferred at one time. In certain embodiments, there is a key transfer (of one, or of a set) from the key manager 162 to the data storage drive 120a . . . 120n that is done in parallel with the loading of data onto a data storage medium 124a . . . 124n and all key retrievals are memory fetches. In certain embodiments, one base key is transferred (e.g. at load) from die key manager 182 to the data storage drive 120a . . . 120n and then key derivations are performed each time a key is needed (e.g. each data set is encrypted with a different derived key). In certain embodiments, each key transfer is performed when the key is needed.

In block 612, the data storage drive 120a . . . 120n encrypts the element using the retrieved key. In block 614, the data storage drive 120a . . . 120n writes the element to a data storage medium 124a . . . 124n. From block 614, processing continues to block 600, Thus, embodiments enable a data storage drive 120a . . . 120n to use the data context recognition capability (i.e. the ability to identify metadata and data sets based on recognized forms of metadata) to write some elements encrypted and some elements in the effective clear.

Additionally, embodiments enable a data storage drive 120a . . . 120n to use the data context recognition capability to define sets of elements to be encrypted with different encryption keys.

MVS are registered trademarks or common law marks of International Business Machines Corporation in the United States and/or other countries.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes bulls not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g. hard disk drives, floppy disks, tape, etc.), volatile and non-volatile memory devices (e.g. a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g. an integrated circuit chip, Programmable Gate Array (PGA), Application Specific Integrated Circuit (ASIC), etc.). Still further, the code implementing the described operations may be implemented in "transmission signals", where transmission signals may propagate through space or through transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic Is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing Integrating computer-readable code into a computing system, wherein the code in combination with the computing system is enabled to perform the operations of the described implementations.

The logic of FIG. 6 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIG. 6 may be implemented in software, hardware, programmable and non-programmable gate array logic or in some combination of hardware, software, or gate array logic.

Figure 7:
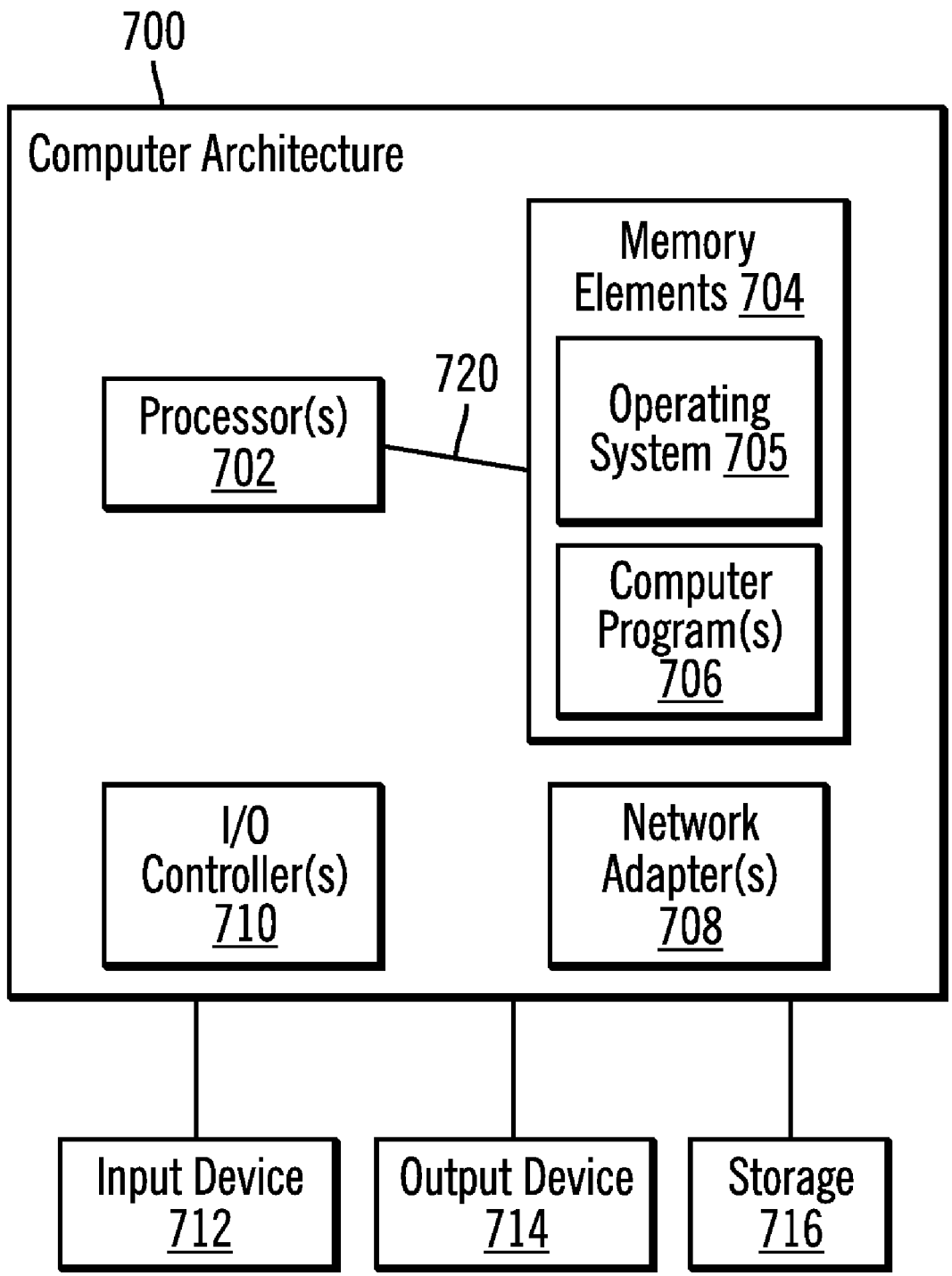
FIG. 7 illustrates a system architecture that may be used in accordance with certain embodiments.

FIG. 7 illustrates a system architecture 700 that may be used in accordance with certain embodiments. Automated data storage library 100, one or more proxy servers (not shown in FIG. 1), and/or one or more key servers 160a . . . 160n may implement system architecture 700. The system architecture 700 is suitable for storing and/or executing program code and includes at least one processor 702 coupled directly or indirectly to memory elements 704 through a system bus 720. The memory elements 704 may include local memory employed during actual execution of the program code, bulk storage, and cache memories which provide temporary storage of at least some program code in order to reduce the number of times code must be retrieved from bulk storage during execution. The memory elements 704 Include an operating system 705 and one or more computer programs 706.

Input/Output (I/O) devices 712, 714 (including but not limited to keyboards, displays, pointing devices, etc) may be coupled to the system either directly or through intervening I/O controllers 710.

Network adapters 708 may also be coupled to the system to enable the data processing system to become coupled to other data processing systems or remote printers or storage devices through intervening private or public networks. Modems, cable modem and Ethernet cards are just a few of the currently available types of network adapters 708.

The system architecture 700 may be coupled to storage 716 (e.g. a non-volatile storage area, such as magnetic disk drives, optical disk drives, a tape drive, etc.). The storage 716 may comprise an internal storage device or an attached or network accessible storage. Computer programs 706 in storage 716 may be loaded into the memory elements 704 and executed by a processor 702 in a manner known in the art.

The system architecture 700 may include fewer components than illustrated, additional components not illustrated herein, or some combination of the components illustrated and additional components. The system architecture 700 may comprise any computing device known in the art, such as a mainframe, server, personal computer, workstation, laptop, handheld computer, telephony device, appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rafter by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently filed claims, and their equivalents.

What is claimed is:

1. A computer-implemented method for determining whether to encrypt data, comprising:
   under control of a tape drive,
      receiving a data stream that includes metadata mixed with data sets, wherein the data sets are delineated by the metadata, and wherein the data stream is to be stored on a data storage medium comprising a tape cartridge; and
   for each element comprising one of the metadata and a data set from the data sets,
      determining whether the element is to be encrypted based on an encryption policy and data context recognition;
      in response to determining that the element is to be encrypted,
         encrypting the element; and
         writing the encrypted element to the data storage medium; and
      in response to determining that the element is not to be encrypted, writing the element in the effective clear to the data storage medium.

2. The method of claim 1, further comprising:
   retrieving the encryption key.

3. The method of claim 2, wherein retrieving further comprises one of: retrieving the encryption key from memory, deriving the encryption key from an existing encryption key, and retrieving the encryption key from the key manager.

4. The method of claim 1, wherein the encryption policy specifies that multiple, different encryption keys are to be used for encrypting the elements to be encrypted, and further comprising:

encrypting a first element using a first encryption key; and
encrypting a second element using a second encryption key.

5. The method of claim 4, wherein the multiple, different encryption keys may be obtained at one time or as needed.

6. The method of claim 1, wherein the encryption policy defines sets of elements to be encrypted with different encryption keys.

7. The method of claim 1, wherein, in response to determining that the element is not to be encrypted, further comprising:
encrypting the element such that the element is not encrypted with a secret key that prevents the element from being read without having that secret key.

8. The method of claim 1, wherein the metadata conforms to recognized forms of metadata used to write header labels, volume labels, and trailer labels.

9. A computer program product comprising a computer-readable medium including a computer readable program, wherein the computer-readable medium is a member of a set of computer-readable media consisting of semiconductor or solid state memory, a magnetic tape, a removable computer diskette, a rigid magnetic disk, an optical disk, a magnetic storage medium, and volatile and non-volatile memory devices, wherein the computer readable program when executed by a processor on a computer causes the computer to:
under control of a tape drive,
receive a data stream that includes metadata mixed with data sets, wherein the data sets that are delineated by the metadata, and wherein the data stream is to be stored on a data storage medium comprising a tape cartridge; and
for each element comprising one of the metadata and a data set from the data sets,
determine whether the element is to be encrypted based on an encryption policy and data context recognition;
in response to determining that the element is to be encrypted,
encrypt the element; and
write the encrypted element to the data storage medium; and
in response to determining that the element is not to be encrypted, write the element in the effective clear to the data storage medium.

10. The computer program product of claim 9, wherein, when identifying, the computer readable program when executed on the computer causes the computer to:
retrieve the encryption key from a key manager.

11. The computer program product of claim 10, wherein, when retrieving, the computer readable program when executed on the computer causes the computer to:
retrieve the encryption key from memory, deriving the encryption key from an existing encryption key, and retrieving the encryption key from the key manager.

12. The computer program product of claim 9, wherein the encryption policy specifies that multiple, different encryption keys are to be used for encrypting the elements to be encrypted, and the computer readable program when executed on the computer causes the computer to:
encrypt a first element using a first encryption key; and
encrypt a second element using a second encryption key.

13. The computer program product of claim 12, wherein the multiple, different encryption keys may be obtained at one time or as needed.

14. The computer program product of claim 9, wherein the encryption policy defines sets of elements to be encrypted with different encryption keys.

15. The computer program product of claim 9, wherein, in response to determining that the element is not to be encrypted, the computer readable program when executed on the computer causes the computer to:
encrypt the element such that the element is not encrypted with a secret key that prevents the element from being read without having that secret key.

16. The computer program product of claim 9, wherein the metadata conforms to recognized forms of metadata used to write one of header labels, volume labels, and trailer labels.

17. A system for determining whether to encrypt data, comprising:
a tape drive including hardware logic performing operations, the operations comprising:
receiving a data stream that includes metadata mixed with data sets, wherein the data sets are delineated by the metadata, and wherein the data stream is to be stored on a data storage medium comprising a tape cartridge; and
for each element comprising one of the metadata and a data set from the data sets,
determining whether the element is to be encrypted based on an encryption policy and data context recognition;
in response to determining that the element is to be encrypted,
encrypting the element; and
writing the encrypted element to the data storage medium; and
in response to determining that the element is not to be encrypted, writing the element in the effective clear to the data storage medium.

18. The system of claim 17, wherein the operations for identifying further comprise:
retrieving the encryption key.

19. The system of claim 18, wherein the operations for retrieving further comprise one of:
retrieving the encryption key from memory, deriving the encryption key from an existing encryption key, and retrieving the encryption key from the key manager.

20. The system of claim 17, wherein the encryption policy specifies that multiple, different encryption keys are to be used for encrypting the elements to be encrypted, and wherein the operations further comprise:
encrypting a first element using a first encryption key; and
encrypting a second element using a second encryption key.

21. The system of claim 20, wherein the multiple, different encryption keys may be obtained at one time or as needed.

22. The system of claim 17, wherein the encryption policy defines sets of elements to be encrypted with different encryption keys.

23. The system of claim 17, wherein, in response to determining that the element is not to be encrypted, the operations further comprise:
encrypting the element such that the element is not encrypted with a secret key that prevents the element from being read without having that secret key.

24. The system of claim 17, wherein the metadata conforms to recognized forms of metadata used to write one of header labels, volume labels, and trailer labels.

25. The system of claim 17, wherein the system comprises a tape library including at least one tape drive.

* * * * *